United States Patent
Bordoz et al.

(10) Patent No.: US 8,925,606 B2
(45) Date of Patent: Jan. 6, 2015

(54) VEHICLE TIRE COMPRISING A TREAD COMPOSED OF A PLURALITY OF COMPOUNDS AND A LAYER OF CIRCUMFERENTIAL REINFORCEMENT ELEMENTS OF VARIABLE PITCH

(75) Inventors: Francis Bordoz, Clermont-Ferrand (FR); Alain Valle, Cebazat (FR); Pascal Prost, Riom (FR)

(73) Assignees: Michelin Recherche Techniques S.A, Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 737 days.

(21) Appl. No.: 13/140,710

(22) PCT Filed: Dec. 9, 2009

(86) PCT No.: PCT/EP2009/066738
§ 371 (c)(1),
(2), (4) Date: Sep. 2, 2011

(87) PCT Pub. No.: WO2010/069840
PCT Pub. Date: Jun. 24, 2010

(65) Prior Publication Data
US 2011/0308678 A1    Dec. 22, 2011

(30) Foreign Application Priority Data
Dec. 17, 2008  (FR) ...................................... 08 58727

(51) Int. Cl.
| | |
|---|---|
| B60C 9/20 | (2006.01) |
| B60C 1/00 | (2006.01) |
| B60C 9/22 | (2006.01) |
| B60C 9/08 | (2006.01) |
| B60C 15/00 | (2006.01) |
| B60C 11/00 | (2006.01) |

(52) U.S. Cl.
CPC ................. *B60C 9/2204* (2013.04); *B60C 9/08* (2013.01); *B60C 15/0018* (2013.04); *B60C 11/0058* (2013.04); *B60C 2200/10* (2013.04); *B60C 2011/0025* (2013.04)
USPC ..................... 152/531; 152/209.5; 152/209.11

(58) Field of Classification Search
CPC ............ B60C 2200/10; B60C 2200/12; B60C 2200/14; B60C 9/04; B60C 9/18; B60C 9/22; B60C 9/2204; B60C 1/00; B60C 1/0016; B60C 11/0008; B60C 11/0041; B60C 11/0058; B60C 11/0066; B60C 9/20; B60C 9/1821; B60C 9/30; B60C 2011/0008; B60C 2011/0025
USPC .......................... 152/531, 209.5, 209.11, 905
See application file for complete search history.

(56) References Cited

U.S. PATENT DOCUMENTS

| | | | | |
|---|---|---|---|---|
| 6,125,898 | A  * | 10/2000 | Watkins et al. | 152/209.5 |
| 6,276,415 | B1 * | 8/2001  | Nakamura      | 152/209.11 |

(Continued)

FOREIGN PATENT DOCUMENTS

| | | |
|---|---|---|
| EP | 1 800 906 | 6/2007 |
| EP | 1 852 277 | 11/2007 |

(Continued)

*Primary Examiner* — Eric Hug
(74) *Attorney, Agent, or Firm* — Cozen O'Connor

(57) ABSTRACT

A tire comprising a reinforcing structure of the carcass type and comprising under the tread strip a crown reinforcing structure comprised of at least one layer of reinforcing elements. At least the surface of the tread strip comprises a first polymer compound extending at least into the region of the equatorial plane and at least one second polymer compound having physicochemical properties that differ from those of the first polymer compound, the crown reinforcing structure comprising at least one layer of circumferential reinforcing elements which are distributed in the transverse direction with a variable pitch and the pitch between the circumferential reinforcing elements being at a minimum in the region of the layer of circumferential reinforcing elements that radially face the ends of the first compound.

8 Claims, 3 Drawing Sheets

(56) References Cited

U.S. PATENT DOCUMENTS

| | | | |
|---|---|---|---|
| 6,311,747 B1 * | 11/2001 | Armellin et al. | 152/209.11 |
| 2003/0155056 A1 | 8/2003 | Armellin | |
| 2008/0035263 A1 * | 2/2008 | Nakamura | 152/537 |
| 2008/0314485 A1 * | 12/2008 | Hirano | 152/209.11 |

FOREIGN PATENT DOCUMENTS

| | | |
|---|---|---|
| EP | 1 950 059 | 7/2008 |
| FR | 2 886 215 | 12/2006 |
| WO | WO 2004/018236 | 3/2004 |

\* cited by examiner

VEHICLE TIRE COMPRISING A TREAD COMPOSED OF A PLURALITY OF COMPOUNDS AND A LAYER OF CIRCUMFERENTIAL REINFORCEMENT ELEMENTS OF VARIABLE PITCH

RELATED APPLICATION

This is a U.S. National Phase Application under 35 USC 371 of International Application PCT/EP2009/066738, filed on Dec. 9, 2009.

This application claims the priority of French patent application Ser. No. 08/58727 filed Dec. 17, 2008, the entire content of which is hereby incorporated by reference.

FIELD OF THE INVENTION

The invention relates to a tire intended to be fitted to a vehicle and, more particularly, intended to be fitted to a two-wheel vehicle such as a motorcycle.

Although not restricted to such an application, the invention will be described more particularly with reference to such a motorcycle, or motorbike, tire.

BACKGROUND OF THE INVENTION

The reinforcement that reinforcing tires and, notably, motorcycle tires, is currently—and usually—made up of a stack of one or more plies conventionally known as "carcass plies", "crown plies", etc. This way of naming the reinforcements stems from the method of manufacture which involves producing a series of semi-finished products in the form of plies, provided with elementary reinforcements, which are often longitudinal, which are subsequently assembled or stacked to build up a green tire. The plies are produced flat, with large dimensions, and are subsequently cut to suit the dimensions of a given product. The plies are also initially assembled in a substantially flat shape. The green tire thus built is then shaped to adopt the toroidal profile typical of tires. The so-called "finishing" semi-finished products are then applied to the green tire to obtain a product ready to be vulcanised.

Such a "conventional" type of method involves, particularly for the phase of building the green tire, the use of an anchoring element (generally a bead wire) which is used to anchor or hold the carcass reinforcement in the region of the beads of the tire. Thus, for this type of method, a portion of all the plies that make up the carcass reinforcement (or just part thereof) is wrapped around a bead wire positioned in the bead of the tire. This then anchors the carcass reinforcement in the bead.

The widespread use throughout industry of this conventional type of method, despite the numerous alternative variations used regarding the creation of the plies and assemblies, has led a person skilled in the art to employ terminology based on the method: hence the generally accepted terminology comprising notably the terms "plies", "carcass", "bead wire", "shaping" to denote the switch from a flat profile to a toroidal profile, etc.

Nowadays there are tires which do not strictly speaking have "plies" or "bead wires" as defined in the above definitions. For example, document EP 0 582 196 describes tires which are manufactured without the use of semi-finished products in the form of plies. For example, the reinforcing elements in the various reinforcing structures are applied directly to the adjacent layers of rubber compound, everything being applied in successive layers to a toroidal form the shape of which makes it possible to obtain directly a profile that can be likened to the final profile of the tire that is being built. Thus, in this case, there are no longer any "semi-finished products", or any "plies", or any "bead wires". The basic products, such as the rubber compounds and the reinforcing elements in the form of threads or filaments, are applied directly to the form. Because this form is of toroidal shape, the green tire no longer has to be shaped in order to change from a flat profile to a profile in the shape of a torus.

Furthermore, the tires described in that document do not have the "traditional" turning back of the carcass ply around a bead wire. That type of anchorage is replaced by an arrangement in which circumferential threads are positioned adjacent to the said sidewall reinforcing structure, everything being embedded in a rubber anchoring or cushioning compound.

There are also methods of assembly on a toroidal form that use semi-finished products which are specially designed for rapid, effective and simple laying on a central form. Finally, it is also possible to use a hybrid comprising both certain semi-finished products for creating certain architectural aspects (such as plies, bead wires, etc.), while others are achieved by the direct application of compounds and/or reinforcing elements.

In this document, in order to take account of recent technological advances both in the field of manufacture and in that of the product design, the conventional terms such as "plies", "bead wires", etc., are advantageously replaced by neutral terms or terms that are independent of the type of method used. Thus, the term "carcass-type reinforcement" or "sidewall reinforcement" is valid for denoting the reinforcing elements in a carcass ply in the conventional method and the corresponding reinforcing elements generally applied to the sidewalls of a tire produced using a method that does not employ semi-finished products. The term "anchoring region", for its part, can just as easily denote the "traditional" wrapping of the carcass ply around a bead wire in a conventional method as it can the assembly formed by the circumferential reinforcing elements, the rubber compound and the adjacent sidewall reinforcement portions of a bottom region produced using a method involving applying products to a toroidal form.

The longitudinal direction of the tire, or circumferential direction, is the direction corresponding to the periphery of the tire and defined by the direction in which the tire runs.

A circumferential plane or circumferential plane of section is a plane perpendicular to the axis of rotation of the tire. The equatorial plane is the circumferential plane that passes through the centre or crown of the tread strip.

The transverse or axial direction of the tire is parallel to the axis of rotation of the tire.

The radial direction is a direction that intersects the axis of rotation of the tire and is perpendicular thereto.

The axis of rotation of the tire is the axis about which it rotates in normal use.

A radial or meridian plane contains the axis of rotation of the tire.

As with all other tires, tires for motorbikes are switching over to a radial design, the architecture of such tires comprising a carcass reinforcement formed of one or two layers of reinforcing elements that make an angle possibly comprised between 65° and 90° with the circumferential direction, the said carcass reinforcement being radially surmounted by a crown reinforcement formed of reinforcing elements. There do, however, still remain some non-radial tires to which the invention also relates. The invention also relates to partially radial tires, that is to say tires in which the reinforcing elements of the carcass reinforcement are radial over at least part of the said carcass reinforcement, for example in the part corresponding to the crown of the tire.

Numerous crown reinforcement architectures have been proposed, depending on whether the tire is intended to be fitted at the front of the motorbike or at the rear. A first structure, for the said crown reinforcement, consists in using only circumferential cords, and the said structure is more particularly used for a rear tire. A second structure, taking its inspiration directly from the structures commonly employed in passenger vehicle tires, has been used to improve wear resistance and consists in using at least two working crown layers of reinforcing elements that are substantially mutually parallel within each layer but crossed from one layer to the next making acute angles with the circumferential direction, such tires being more particularly suited to the front of motor-bikes. The said two working crown layers can be associated with at least one layer of circumferential elements, which are generally obtained by the helical winding of a strip of at least one rubber-coated reinforcing element.

The choice of crown architecture for the tires has a direct impact on certain tire properties such as wear, endurance, grip or even driving comfort or, particularly in the case of motor-cycles, stability. However, other tire parameters such as the nature of the rubber compounds used in the tread strip also have an impact on the properties of the said tire. The choice and nature of the rubber compounds used in the tread strip are, for example, essential parameters regarding wear properties. The choice and nature of the rubber compounds used in the tread strip also have an impact on the grip of the tire.

SUMMARY OF THE INVENTION

It is an object of the invention to provide a tire that is able to improve the wear properties of the tire and to improve the grip properties of the tread of the tire, in the case of motor-cycle tires.

This object has been achieved according to one aspect of the invention directed to a tire comprising a reinforcing structure of the carcass type, formed of reinforcing elements anchored on each side of the tire to a bead the base of which is intended to be mounted on a rim seat, each bead being extended radially outwards by a sidewall, the sidewalls being joined radially towards the outside to a tread strip, and comprising under the tread strip a crown reinforcing structure comprising one layer of reinforcing elements, at least the surface of the tread strip comprising a first polymer compound extending at least into the region of the equatorial plane and of at least one second polymer compound having physicochemical properties that differ from those of the first polymer compound, the crown reinforcing structure comprising at least one layer of circumferential reinforcing elements which are distributed in the transverse direction with a variable pitch and the pitch between the circumferential reinforcing elements being at a minimum in the region of the layer of circumferential reinforcing elements that radially face the ends of the first compound.

A layer of circumferential reinforcing elements within the meaning of the invention comprising one reinforcing element oriented at an angle of less than 5° formed with the longitudinal direction.

The variation in the pitch between the circumferential reinforcing elements is embodied by a variation in the number of circumferential reinforcing elements per unit length in the transverse direction and, therefore, by a variation in the density of circumferential reinforcing elements in the transverse direction and therefore by a variation in the circumferential stiffness in the transverse direction.

The tread strip of the tire according to an embodiment of the invention therefore comprises on the surface of a central circumferential strip or part comprised of a first polymer compound and of at least two lateral strips or parts made of another polymer compound. The lateral strips are advantageously identical in order to create a tire that is symmetrical but may, in certain embodiments, consist of different compounds. The central circumferential strip or part extends axially, according to an embodiment of the invention, over a region comprising the equatorial plane.

According to one advantageous embodiment of the invention, in order to give the tire symmetric properties, the central circumferential strip is advantageously centred on the equatorial plane. According to other embodiments intended, for example, for tires that are to run on a circuit comprising corners that are essentially all in the same direction, the central circumferential strip may be not centred on the equatorial plane.

Advantageous alternative forms of the invention may foresee the presence of five or more circumferential strips in order to form at least the surface of the tread strip and thus provide a gradual evolution in the properties of the said tread strip from the equatorial plane towards the shoulders. As before, such an embodiment may be symmetric with respect to the equatorial plane or not, the distribution of the strips differing either in terms of their composition or in terms of their distribution in relation to the equatorial plane.

One advantageous alternative form of the invention also foresees, notably in the case of there being at least five circumferential strips forming at least the surface of the tread strip, a distribution of the said circumferential strips that is such that the properties of the radially outer circumferential strips and those facing the ends of the half-layers that form the carcass structure differ from those of the other circumferential strips so that the variation from the crown towards the shoulders is not gradual. In other words, the radially outer circumferential strips and those facing the ends of the half-layers for example have properties superior or inferior to those of the other circumferential strips covering the axially outer parts and the central part of the tread strip.

According to one preferred embodiment of the invention, the second polymer compound is of a composition that differs from that of the first polymer compound, and more preferably still, the second polymer compound has grip properties that are superior to those of the said first polymer compound.

According to other embodiments, different properties can be obtained using identical compounds but different vulcanizing conditions.

According to an embodiment of the invention, the second polymer compound has a Shore A hardness that differs from that of the first polymer compound.

The Shore A hardness of the polymer compounds after curing is assessed in accordance with standard ASTM D 2240-86.

Other properties of the second polymer compound may differ. These may, for example, relate to the colour which may provide a functional and/or aesthetic effect.

Further, the crown reinforcing structure of the tire according to an embodiment of the invention comprises one layer of circumferential reinforcing elements distributed in the transverse direction at a variable pitch, the pitch between the circumferential reinforcing elements being at a minimum in the region of the layer of circumferential reinforcing elements radially facing the ends of the first compound. In other words, the density of the circumferential reinforcing elements is greater facing the ends of the first compound and therefore the density of the circumferential reinforcing elements increases from one end of the layer of circumferential reinforcing elements as far as the region facing a second end of the first compound then decreases from the said region as far as the crown of the tire.

According to a first embodiment of the invention, the pitch between the circumferential reinforcing elements at the centre (crown) of the tread strip is less than at the edges of the said layer. Such an embodiment according to the invention notably encourages resistance towards external attack which is greatest in the central region of the tire.

According to a second embodiment of the invention, the pitch between the circumferential reinforcing elements at the centre (crown) of the tread strip is greater than at the edges of the said layer. Such an embodiment according to the invention notably encourages the flattening of the tire at high camber angles.

According to a preferred embodiment of the invention, the value of the pitch in the transverse direction obeys a series over at least one part of the axial width of the said layer.

According to a first embodiment, the value of the pitch obeys an arithmetic series of the type $U(n)=U_0+nr$, where $U_0$ is comprised between 0.4 mm and 2.5 mm, and r is the common difference of the series comprised between 0.001 and 0.1.

According to a second embodiment, the value of the pitch obeys a geometric series of the type $U(n)=U_0 \times r^n$, where $U_0$ is comprised between 0.4 mm and 2.5 mm, and r is the common difference of the series comprised between 1.001 and 1.025.

According to other embodiments of the invention, the value of the pitch may be a combination of several progressions depending on the axial position in the said layer.

A tire thus produced according to the invention makes it possible to improve the performance in terms notably of wear and of grip because of the choices made regarding the polymer compounds involved in the tread strip and because of the presence of at least one layer of circumferential reinforcing elements the density of which is at a maximum in the region of the layer of circumferential reinforcing elements that radially faces the ends of the first compound. The maximum density of the reinforcing elements directed circumferentially in the region radially facing the ends of the first compound notably encourages the reaction of loads at the ends of the first compound and therefore where the two compounds meet and contributes to improving tire performance.

One advantageous embodiment of the invention makes provision that the layer of circumferential reinforcing elements is positioned at least partially radially on the outside of a working layer. When the layer of circumferential reinforcing elements is produced radially on the outside of two working layers and placed directly under the tread strip, it may notably contribute to improving high-speed stability.

The layer of circumferential reinforcing elements may thus be produced directly under the tread strip in order, in addition to performing its main function, to form a layer that protects the carcass and the other layers of the crown reinforcing structure against potential mechanical attack.

The layer of circumferential reinforcing elements may also be produced between the working layers, notably for economic reasons, because this reduces the amount of material and laying time required.

Another advantageous embodiment of the invention makes provision that the layer of circumferential reinforcing elements is positioned at least partially radially on the inside of the radially innermost working layer. In this embodiment, the layer of circumferential reinforcing elements is produced radially on the inside of the working layers and may notably make it possible to improve the grip and traction of the tire still further.

Another alternative form of the invention makes provision that at least one layer of circumferential reinforcing elements is positioned at least partially radially on the inside of the carcass-type reinforcing structure.

A tire according to the invention, notably when at least part of the crown reinforcing structure, such as a layer of circumferential reinforcing elements, is produced radially on the inside of the carcass structure, is advantageously produced using a manufacturing technique of the type involving a hard core or stiff form.

For preference also, the reinforcing elements of the layer of circumferential reinforcing elements are made of metal and/or textile and/or glass. The invention notably makes provision for the use of reinforcing elements of different natures within a single layer of circumferential reinforcing elements.

For preference also, the reinforcing elements of the layer of circumferential reinforcing elements have an elastic modulus in excess of 6000 N/mm$^2$.

Advantageously too, the radial thickness of the first and second polymer compounds may be different so as to axially optimize the wear of the tread. Advantageously too, the thicknesses vary gradually.

In an advantageous alternative form of the invention, one layer of circumferential reinforcing elements may be produced in several parts positioned at different radial positions or different levels in the tire. Such a tire may notably comprise part of the layer of circumferential reinforcing elements radially on the outside of the other reinforcing elements in the central part of the tire, that is to say under the central part of the tread strip. This part of the layer of circumferential reinforcing elements then notably affords the carcass protection against potential attack that may occur in the central part of the tread strip, which is considered to be the most exposed. Lateral parts of the layer of circumferential reinforcing elements, independent of the central part of the said layer of circumferential reinforcing elements, may be positioned at all levels, that is to say either radially on the inside of the working layers or between them or, alternatively, radially on the inside of the carcass layer, notably with a view to reducing the amount of reinforcing elements and the time taken to produce such a layer of circumferential reinforcing elements. The invention further makes provision that, in the case of a layer of circumferential reinforcing elements which is produced in several parts positioned at different radial positions, the distribution of these various parts is not symmetric with respect to the equatorial plane, or circumferential plane, passing through the centre of the crown of the tire. Such an asymmetric distribution may be further associated with a choice of different materials for the circumferential reinforcing elements.

According to this type of embodiment of a layer of circumferential reinforcing elements which is broken down into several parts, the invention advantageously plans for the axial ends of the said parts to overlap one another.

According to a preferred embodiment of the invention, the reinforcing elements of the carcass-type reinforcing structure make an angle comprised between 65° and 90° with the circumferential direction.

According to an alternative form of the invention, the crown reinforcing structure comprises at least two layers of reinforcing elements, the portions making angles comprised between 20 and 160° with one another, from one layer to the next, and preferably greater than 40°.

According to a preferred embodiment of this alternative form of the invention, at least in the central region of the tread strip, the reinforcing elements of a working layer make angles, formed with the longitudinal direction, which are identical, the said angles being measured at the points of intersection with a circumferential plane, whatever the said circumferential plane might be. In other words, for a given circumferential plane of section, the reinforcing elements are all at the same angle formed with the longitudinal direction at the points of intersection with the said circumferential plane of section. Moreover, the aforementioned angle may vary according to the circumferential plane of section considered.

For preference also according to this alternative form of the invention, at least in the central region of the tread strip, the reinforcing elements of one working layer are equidistant from one another in all circumferential planes; the distance separating adjacent reinforcing elements being able for its part to vary according to the circumferential plane of section considered or, more specifically, it being possible for the distance between adjacent reinforcing elements to vary in the axial direction.

Another alternative form of embodiment of the invention makes provision that at least one working layer is produced at least partially radially on the inside of the carcass-type reinforcing structure.

According to a first embodiment of the invention, all of the working layers are produced radially on the inside of at least one carcass structure, i.e. on the inside of at least one carcass layer. At least one carcass-type reinforcing structure thus radially covers the entire crown reinforcing structure.

According to a second preferred embodiment of the invention, at least one layer of working reinforcing elements of the crown reinforcing structure is produced radially on the outside of the carcass-type reinforcing structure. According to this second embodiment of the invention, the layer of working reinforcing elements assumes a function of protecting the carcass and the other layers of the crown reinforcing structure against possible mechanical attack.

In an advantageous alternative form of the invention, one layer of working reinforcing elements may be produced in several parts fitted at different radial positions or different levels in the tire. Such a tire may notably comprise a part of the layer of working reinforcing elements radially on the outside of the reinforcing elements of the carcass structure in the central part of the tire, i.e. under the central part of the tread strip. This part of the layer of working reinforcing elements then notably affords the carcass protection against potential attack that may occur via the central part of the tread strip, which is considered to be the most exposed. The invention also makes provision, in the case of a layer of working reinforcing elements that is produced in several parts installed at various radial positions, that the distribution of these different parts is not symmetric with respect to the equatorial plane, or circumferential plane passing through the centre of the crown of the tire.

According to this type of embodiment of a layer of working reinforcing elements broken down into several parts, the invention advantageously makes provision for the axial ends of the said parts to overlap one another.

It should be noted, as stated previously, that a tire according to the invention, notably when at least part of the crown reinforcing structure is produced radially on the inside of the carcass structure, is advantageously produced using a manufacturing technique of the type using a hard core or stiff form.

According to an alternative form of embodiment of the invention, at least one layer of working reinforcing elements is made up of at least one continuous reinforcing thread which, in the central region of the said layer, forms portions making identical angles with the longitudinal direction, the said angles being measured at the points of intersection with a circumferential plane, two adjacent portions being connected by a loop, and the portions making an angle comprised between 10 and 80°, and preferably greater than 20°, with the longitudinal direction.

The term "thread" denotes, very generally, both monofilaments, multifilament fibres (possibly twisted on themselves) or assemblies such as textile or metal cords, folded yarns or alternatively any type of equivalent assembly, for example a hybrid cord, irrespective of the material or materials or potential treatment of these threads, for example a surface treatment or coating, or precoating to encourage adhesion to the rubber or any other material.

According to this advantageous alternative form of the invention, the working layer is produced with at least one thread no free end of which is present on the edges of the said layer. For preference, the layer is produced using a single thread and the layer is of the "single thread" type. However, industrial production of such layers leads to discontinuities notably as a result of changes of reel. A preferred embodiment of the invention further consists in using just one or a small number of threads for a working layer and the starts and ends of threads need to be positioned in the central region of the said layer.

A tire according to the invention thus produced comprises a reinforcing structure that has no free end of the reinforcing elements at the axially outer edges of the working layers.

The studies conducted notably revealed that the presence of traditional layers of reinforcing elements set at an angle to the longitudinal direction leads to local, circumferential and shear, stiffnesses which decrease as the edges of the said layers are neared, the tension at the ends of the reinforcing elements being zero. Zero local tension in the reinforcing elements results in lower effectiveness of the said reinforcing elements in this region. Now, the stiffnesses of the edges of the layers are particularly high when the tire is used at steeper camber angles, under cornering, the part of the tire corresponding to these regions then facing the ground.

The creation of motorcycle tires leads to high values of curvature when the said tires are used at camber angles. A tire produced according to this alternative form of the invention and which comprises a reinforcing structure that has no free end of the reinforcing elements in the region of the axially outer edges of the working layers thus notably allows the grip and traction of the tires to be enhanced for use at steep camber angles.

Such a tire is advantageously produced using a technique of the type using a hard form or a toroidal form, which notably allows the reinforcing elements to be laid in the near-final position; specifically, a shaping step is not required with this type of method, which means that the reinforcing elements are no longer shifted once they have been laid.

In one advantageous embodiment of the invention, notably with a view to further optimizing the stiffnesses of the reinforcing structure along the meridian plane of the tire, particularly at the edges of the working layers, the angles formed by the said portions of the thread in the working layers with the longitudinal direction can vary in the transverse direction such that the said angles are greater on the axially outer edges of the layers of reinforcing elements by comparison with the angles of the said portions measured at the equatorial plane of the tire.

The use of a technique of the type using a hard form which notably allows the reinforcing elements to be laid in the near-final position without the need for a shaping step has further advantages. Specifically, a technique of the hard form type in particular allows markedly greater variations in angles than can be obtained using methods that involve a shaping step to be achieved in a simple way. Further, the said variations in angle, the said angle tending towards 90° at the edges of the working layers, leads to an increase in the pitch and encourages the creation of loops, because of the reduction in bulk.

A first embodiment of the alternative forms of embodiment of the invention whereby the angles formed by the said portions of the thread in the working layers with respect to the longitudinal direction can vary in the transverse direction, consists in varying the angle of the portions monotonously from the equatorial plane of the tire as far as the edges of the working layer.

A second embodiment of these alternative forms consists in having the angle change in steps from the equatorial plane of the tire as far as the edges of the working layer.

A final embodiment of these alternative forms consists in allowing the angle to evolve in such a way that given values are obtained for given axial positions.

These various embodiments of the alternative forms of embodiment of the invention whereby the angles formed by the said portions of the thread of the working layers with respect to the longitudinal direction can vary in the transverse direction in other words make it possible to obtain good circumferential stiffness of the crown reinforcing structure through the presence of tight, that is to say small, angles in the region of the crown of the tire, that is to say in the region flanking the equatorial plane. Further, on the other hand, the presence of open angles, that is to say angles tending towards 45°, or, even beyond, tending towards 90°, can be obtained on the edges of the working layer or, more exactly, at the shoulders of the tire in order to improve the grip, traction, comfort or else the operating temperature of the tire; specifically, such variations in angle make it possible to modulate the shear stiffnesses of the working layers.

According to one preferred embodiment of the invention, the reinforcing elements of the working layers are made of a textile material.

According to another embodiment of the invention, the reinforcing elements in the working layers are made of metal.

BRIEF DESCRIPTION OF THE DRAWINGS

Further details and advantageous features of the invention will emerge hereinafter from the description of the exemplary embodiments of the invention, given with reference to FIGS. 1 to 3 which depict:

For ease of understanding, FIGS. 1 to 3 are not drawn to scale.

DETAILED DESCRIPTION OF THE DRAWINGS

Figure 1:
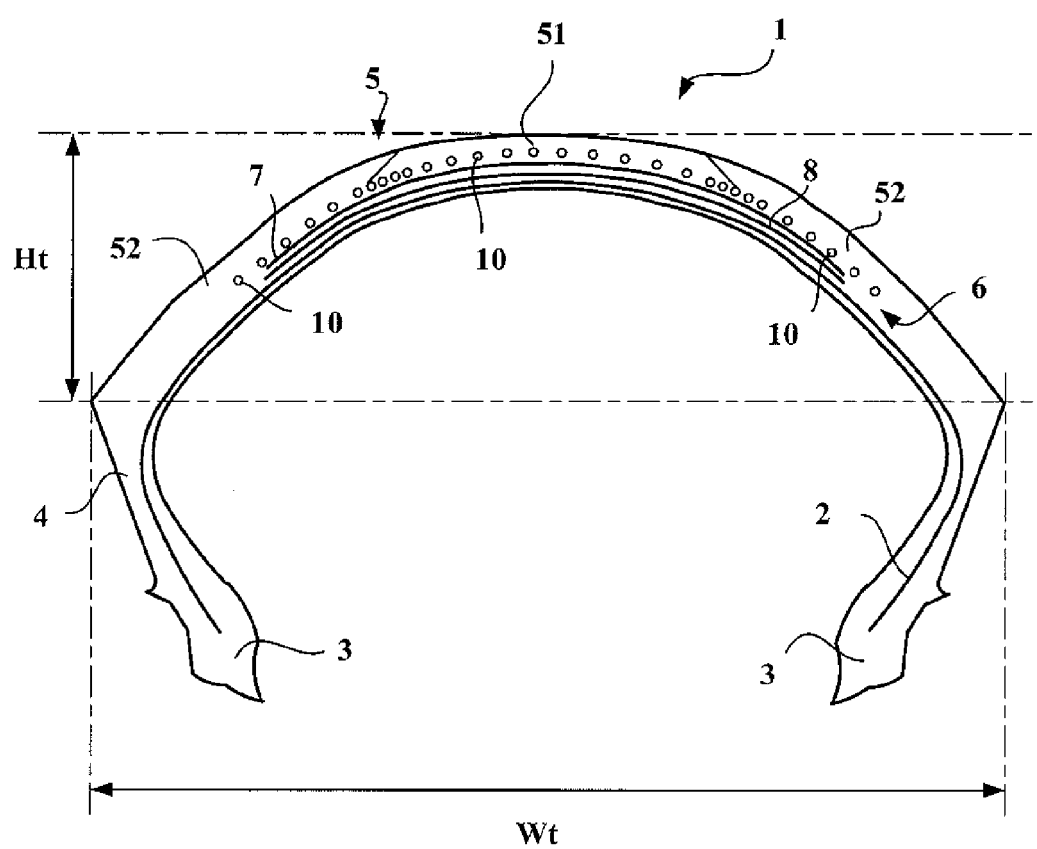
FIG. 1: a meridian view of a tire layout according to a first embodiment of the invention.

FIG. 1 depicts a tire 1 comprising a carcass reinforcement consisting of a layer 2 comprising reinforcing elements of the textile type. The layer 2 consists of reinforcing elements arranged radially. The radial positioning of the reinforcing elements is defined by the angle at which the said reinforcing elements are laid; a radial arrangement corresponds to the said elements being laid at an angle comprised between 65° and 90° with respect to the longitudinal direction.

The layer 2 is anchored on each side of the tire 1 in a bead 3 the base of which is intended to be mounted on a rim seat. Each bead 3 is extended radially outwards by a sidewall 4, the said sidewall 4 radially towards the outside meeting the tread strip 5. The tire 1 thus constructed has a curvature value in excess of 0.15 and preferably in excess of 0.3. The curvature value is defined by the Ht/Wt ratio, namely the ratio of the height of the tread strip to the maximum width of the tread strip of the tire. The curvature value will advantageously be between 0.25 and 0.5 for a tire intended to be fitted at the front of a motorcycle and will be advantageously comprised between 0.2 and 0.5 for a tire intended to be fitted at the rear.

The tire 1 further comprises a crown reinforcement 6 consisting of two layers 7 and 8 of reinforcing elements making angles with the circumferential direction, the said reinforcing elements being crossed from one layer to the next and making angles of 50° between them in the region of the equatorial plane, the reinforcing elements of each of the layers 7 and 8 making an angle of 25° to the circumferential direction.

The reinforcing elements of the two layers 7 and 8 are made of a textile material and, more specifically, of aramid.

The crown reinforcement 6 according to the invention comprises a layer of circumferential reinforcing elements 10 radially on the outside of the layers 7, 8. The layer of circumferential reinforcing elements 10 is thus the radially outermost part of the crown reinforcement 6 and the two working layers 7, 8 are interposed between the carcass layer 2 and the layer of circumferential reinforcing elements 10. The layer of circumferential reinforcing elements 10 advantageously consists of a single thread which has been wound to make an angle substantially equal to 0° with the longitudinal direction. The layer of circumferential reinforcing elements 10 may alternatively be produced by the simultaneous winding of several bare threads or threads in the form of strips when they are embedded in rubber.

The circumferential reinforcing elements 10 are wound in such a way that the pitch between two circumferential reinforcing elements varies in the axial direction.

This variation in the laying pitch leads to a variation in the density of the circumferential reinforcing elements that is such that the density is greater in the region facing the ends of the first compound. The circumferential reinforcing element densities will therefore decrease, firstly from these regions with a density of 85 threads/dm towards the central part of the tire with a density of 60 threads/dm, and secondly, from these regions towards the lateral parts of the said layer of circumferential reinforcing elements 10 with a density of 70 threads/dm.

The presence of the layer of circumferential reinforcing elements in the tire contributes firstly to improving performance in terms of endurance and secondly the distribution at a variable pitch allows the circumferential stiffnesses of the crown reinforcement of the tire to be modulated in order to optimize the compromises between flattening, wear and high-speed performance of the tire.

The layer of circumferential reinforcing elements 10 consists of textile reinforcements of the aramid 167/3 type.

The tread strip 5 consists, according to the invention, of a first rubber compound 51 in its central part and of a second rubber compound 52 in the lateral parts. The joins between the parts 51 and 52 that form the tread strip 5 are advantageously made progressively with a chamfered interface, the angle of the chamfer ranging between 20 and 60° with respect to the exterior surface of the tread strip 5 of the tire 1.

The rubber compound 52 is advantageously chosen so that its grip properties are superior to those of the rubber compound 51, the said rubber compound 51 being more particularly chosen for its resistance to wear. The tread strip thus created may make it possible to define a compromise between resistance to wear and grip that is better than can be obtained with just one rubber compound.

The combination of a tread strip consisting of several compounds according to the tire 1 and of a layer of circumferential reinforcing elements which are distributed in the transverse direction at a variable pitch, the pitch between the circumferential reinforcing elements being at a minimum in the region of the layer of circumferential reinforcing elements that radially faces the ends of the first compound makes it possible to improve the performance in terms of grip, in terms of wear and in terms of torque transfer when the tire is mounted on a motorcycle.

Figure 2:
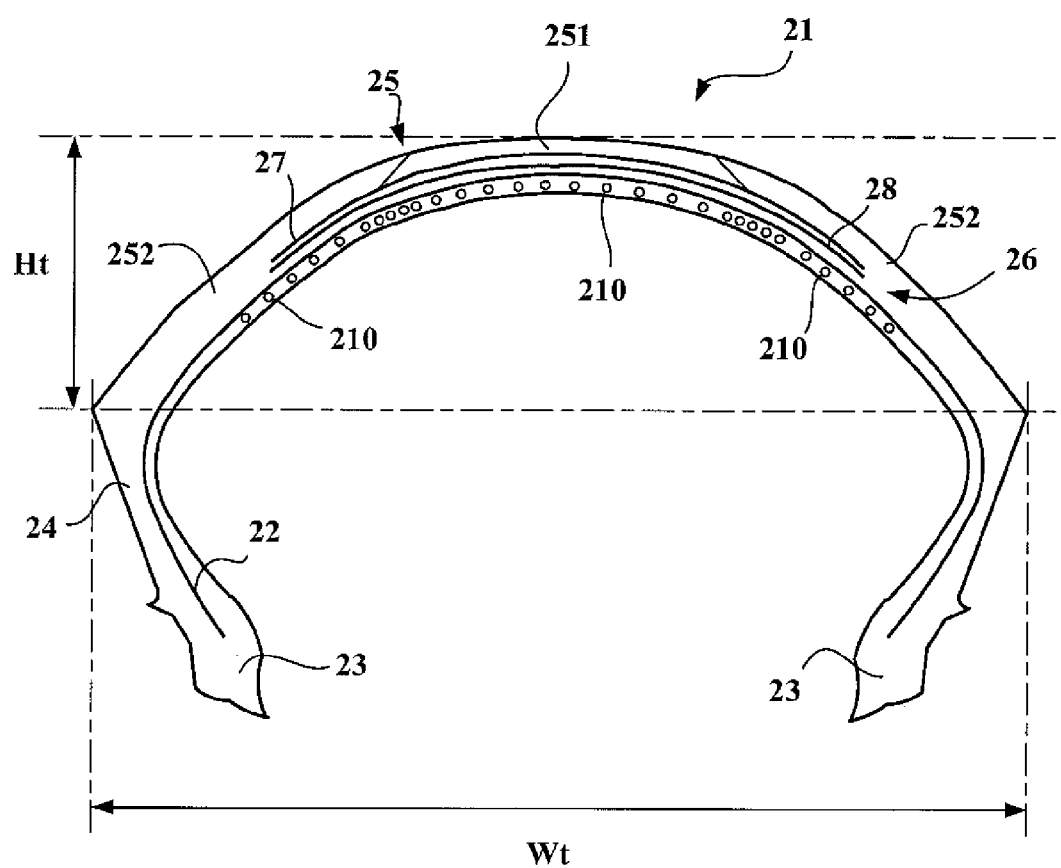
FIG. 2: a meridian view of a tire layout according to a second embodiment of the invention.

FIG. 2 depicts a tire 21 similar to that of FIG. 1 and which differs therefrom in the radial position of the layer of circumferential reinforcing elements 201. In this second depiction according to the invention, the layer of circumferential reinforcing elements 210 has been positioned radially on the inside of the carcass reinforcement 2 and therefore radially on the inside of the two working layers 27, 28. This radial position of the layer of circumferential reinforcing elements 210 allows in particular a further improvement in the grip and traction properties of the tire.

Figure 3:
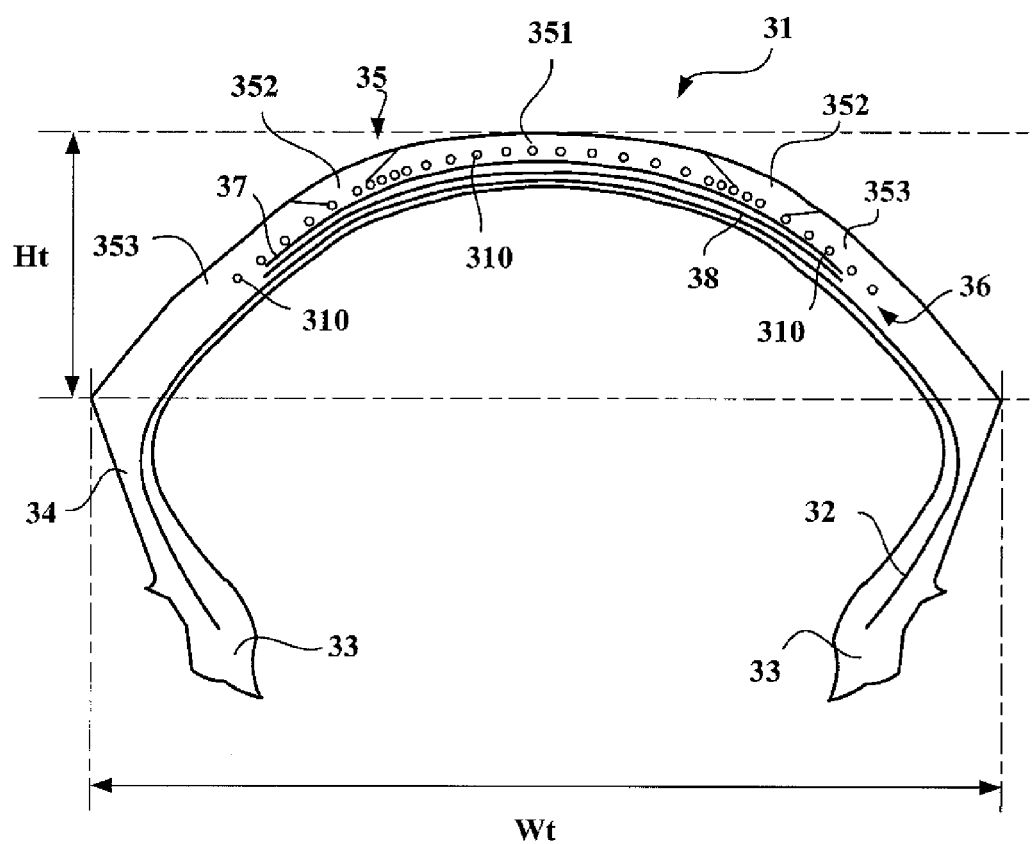
FIG. 3: a meridian view of a tire layout according to a third embodiment of the invention.

FIG. 3 depicts a tire 31 similar to that of FIG. 1 and which differs therefrom in terms of a tread strip made up of three rubber compounds 351, 352, 353 forming five circumferential strips.

According to such an embodiment of the invention, the rubber compounds 351, 352, 353 have different physicochemical properties. According to a first type of embodiment, they are configured in such a way as to exhibit a gradient of variation of a property from the crown towards the shoulders of the tire 31. According to another embodiment, the rubber compound 352 has a property, for example its hardness, superior to those of the other compounds 351, 353, it being possible for the latter to be identical or non-identical.

The invention should not be interpreted as being restricted to the description of the examples above. It notably makes provision for combining the various embodiments of the invention illustrated in FIGS. 2 and 3.

The invention notably also encompasses tires that may have more complex crown reinforcements, for example comprising 3 or more working layers of reinforcing elements making an angle with the circumferential direction.

The invention also applies to the various types of crown reinforcement listed hereinabove and notably those described in patent applications WO 2004/018236, WO 2004/018237, WO 2005/070704, WO 2005/070706, notably exhibiting the various radial positions of the layers that make up the crown reinforcement relative to one another, and their radial position with respect to the carcass structure, plus also the makeup of a layer formed of a thread constituting portions connected by loops or even varied angles formed by the said portions with the axial direction.

The invention claimed is:

1. A tire comprising:
a reinforcing structure of the carcass type, formed of reinforcing elements anchored on each side of the tire to each of the tire's two beads, each of said two beads having a base which is configured to be mounted on a rim seat, and being extended radially outwards by each of the tire's two sidewalls, said two sidewalls being joined radially outward to a tread strip; and
a crown reinforcing structure disposed under said tread strip, and comprising one layer of reinforcing elements,
wherein at least the surface of said tread strip comprises a first polymer compound extending at least into the area of the equatorial plane and a second polymer compound having physicochemical properties that differ from those of said first polymer compound,
wherein said crown reinforcing structure comprises one layer of circumferential reinforcing elements which are distributed in the transverse direction with a variable pitch,
wherein the pitch between said circumferential reinforcing elements is at a minimum in a region of said one layer of circumferential reinforcing elements that radially faces the ends of said first polymer compound, and
wherein the pitch increases, firstly, from said region towards the central part of the tire, and secondly from said region towards the lateral parts of said one layer of circumferential reinforcing elements.

2. The tire of claim 1, wherein said second polymer compound is of a composition that differs from that of said first polymer compound.

3. The tire of claim 1, wherein said second polymer compound has grip properties that are superior to those of said first polymer compound.

4. The tire of claim 1, wherein said second polymer compound has a Shore A hardness that differs from that of said first polymer compound.

5. The tire of claim 1, wherein the pitch between said circumferential reinforcing elements at the centre of said tread strip is greater than at edges of said one layer of circumferential reinforcing elements.

6. The tire of claim 1, wherein the pitch between said circumferential reinforcing elements at the centre of said tread strip is less than at edges of said one layer of circumferential reinforcing elements.

7. The tire of claim 1, wherein said reinforcing elements of reinforcing structure of the carcass-type make an angle comprised between 65° and 90° with the circumferential direction.

8. The tire of claim 1, wherein said crown reinforcing structure comprises two layers of reinforcing elements, and wherein from one layer to the next, the reinforcing elements of said two layers make angles of between 20 and 160° with one another.

* * * * *